United States Patent
Karon et al.

(10) Patent No.: US 11,175,144 B2
(45) Date of Patent: Nov. 16, 2021

(54) MAGNETIC PARAMETER-BASED LOCALIZATION IN MOBILE DEVICE NAVIGATION

(71) Applicants: Joshua Karon, Toronto (CA); Sean Huberman, Guelph (CA)

(72) Inventors: Joshua Karon, Toronto (CA); Sean Huberman, Guelph (CA)

(73) Assignee: Mapsted Corp., Mississauga (CA)

( * ) Notice: Subject to any disclaimer, the term of this patent is extended or adjusted under 35 U.S.C. 154(b) by 0 days.

(21) Appl. No.: 17/062,151

(22) Filed: Oct. 2, 2020

(65) Prior Publication Data

US 2021/0131809 A1 May 6, 2021

Related U.S. Application Data

(63) Continuation-in-part of application No. 16/671,503, filed on Nov. 1, 2019, now Pat. No. 10,837,784.

(51) Int. Cl.
*G01C 21/20* (2006.01)
*G01C 21/00* (2006.01)

(52) U.S. Cl.
CPC ......... *G01C 21/206* (2013.01); *G01C 21/383* (2020.08)

(58) Field of Classification Search
CPC .... G01C 21/005; G01C 21/08; G01C 21/206; G01S 5/0252; H04W 4/023; H04W 4/026; H04W 4/029; H04W 4/33
See application file for complete search history.

(56) References Cited

U.S. PATENT DOCUMENTS

| | | |
|---|---|---|
| 6,539,327 B1 | 3/2003 | Dassot et al. |
| 9,170,112 B2 | 10/2015 | Mirov et al. |
| 9,557,178 B2 | 1/2017 | Ghose et al. |
| 2009/0043504 A1 | 2/2009 | Bandyopadhyay et al. |
| 2013/0150076 A1 | 6/2013 | Kim et al. |
| 2014/0180627 A1 | 6/2014 | Naguib et al. |
| 2015/0018018 A1 | 1/2015 | Shen et al. |
| 2015/0106373 A1 | 4/2015 | Haverinen et al. |
| 2016/0011022 A1 | 1/2016 | Zheng et al. |
| 2016/0379074 A1 | 12/2016 | Nielsen et al. |
| 2017/0219359 A1 | 8/2017 | Elhoushi et al. |
| 2017/0265041 A1 | 9/2017 | Mahasenan et al. |
| 2018/0356475 A1 | 12/2018 | Eitel et al. |

*Primary Examiner* — Ernest G Tacsik (57) ABSTRACT

A method and system of magnetic parameter based mobile device localization. The method comprises obtaining a predetermined number of magnetic parameter measurements corresponding to a plurality of path segments in an indoor path traversed by a mobile device. Based on accessing a reference database associated with the indoor path, a set of reference segments having a magnetic parameter measurement matching a first magnetic parameter measurement may be identified. In accordance with the identified set of reference segments, a set of alternative trajectories of the mobile device are identified. From the set of alternative trajectories, a current alternative trajectory of the mobile device with a maximum match to the first magnetic parameter measurement may be determined. The current alternative trajectory may be iteratively extended to determine a final alternative trajectory matching the predetermined number of magnetic parameter measurements, the mobile device being localized in accordance with the final alternative trajectory.

20 Claims, 5 Drawing Sheets

Receiving, from a mobile device under traversal along an indoor path within an indoor area, a series of magnetic parameter measurements at each of a plurality of path segments

310

---

Identifying, based on accessing reference magnetic data associated with the indoor path, an initial match for respective ones of a subset of path segments from the plurality of path segments in accordance with the magnetic parameter measurements

320

---

Initializing a set of alternative trajectories of the mobile device in accordance with the initial match for the respective ones of the subset of path segments

330

---

Determining, from the set of alternative trajectories, a current trajectory of the mobile device based at least in part on a best fit with a number of path segments associated with set of alternative trajectories

MAGNETIC PARAMETER-BASED LOCALIZATION IN MOBILE DEVICE NAVIGATION

CROSS-REFERENCE TO RELATED APPLICATION

This application claims the benefit of priority to U.S. application Ser. No. 16/671,503 filed on 1 Nov. 2019.

TECHNICAL FIELD

The disclosure herein relates to the field of magnetic based localization for mobile device navigation.

BACKGROUND

Users of mobile devices are increasingly using and depending upon indoor positioning and navigation applications and features. Seamless, accurate and dependable indoor positioning can be difficult to achieve using satellite-based navigation systems when the latter becomes unavailable or sporadically available, such as within enclosed or partly enclosed urban infrastructure and buildings, including hospitals, shopping malls, airports, universities and industrial warehouses. To address this problem, indoor navigation solutions increasingly rely on sensors such as accelerometers, gyroscopes, and magnetometers which are commonly included in mobile phones and similar mobile devices. Magnetic field data, among other techniques based on wireless communication signal data, ambient barometric data, and mobile device inertial data can be applied in localizing a mobile device along a route traversed within indoor infrastructure.

DETAILED DESCRIPTION

Among other benefits, the disclosure herein provides methods and systems for using magnetic measurements as a primary source of localization data by enabling localization initialization based on the magnetic measurements. Embodiments described here are especially useful and applicable to situations where other absolute location signals, such as wireless signal received signal strength (RSS), Bluetooth Low Energy™ (BLE) and global positioning systems (GPS) are limited. Embodiments enable initialization of localization based on magnetic parameter measurements and provide improved and accurate mobile device positioning performance.

Embodiments herein recognize that Indoor positioning based on magnetic measurements is different than typical RSS based positioning in a few ways:

Magnetic measurements are associated with a segment on a floor plan, not a single point.

Magnetic signals can vary significantly within short distances

Any single magnetic measurement can match to the reference database to many points Due to these differences magnetic positioning has opportunities and challenges. On one hand meter level positioning can be achieved because of the sensitivity of the magnetic signals. On the other hand matching the magnetic signals to the reference set presents a difficult problem because a single signal can match many reference segments. To get around this problem a series of consecutive measurements can be compared to the reference to achieve a high-quality match and therefore meter level positioning.

Meter level positioning can be achieved by matching the real time measurements with the reference measurements. However, making the match is a problem that has to be solved in real time, subject to the processing and memory constrains of a mobile device. The matching problem is a hard problem to solve in real time because series of real time measurement have to be compared to all possible permutations in the reference segment graph. Seeing as individual segments can have many connections this matching problem has to evaluate an exponential number of possible reference segments.

One way to avoid the matching problem is to use magnetic measurements as a positioning signal that is secondary to other absolute signals, such as RSS, BLE and GPS. This can be done by first obtaining a set of possible trajectories based on the primary positioning signals and then using the magnetic matching to select the best trajectory from the set of alternatives. This approach avoids a large number of comparisons seeing as the alternative trajectories are already calculated based on other positioning methods (RSS, BLE, GPS), and the relevant reference magnetic measurements can be selected from the reference set based on such trajectory alternatives.

Initialization as used herein refers to the process of estimating the user's location for the first time with no prior information. This happens when the user launched the navigation application at the mobile device. For initialization, only absolute positioning signals, such as RSS, BLE and GPS, are useful, relative positioning signals, such as inertial measurements, do not help in the initialization process. Embodiments herein provide for magnetic measurements to be used as an absolute positioning signal.

The ability to initialize a mobile device navigation position using additional data sources, such as magnetic measurements, becomes critical as mobile device operating systems (including Android™ 9 and iOS™) are restricting the amount of mobile device WiFi scans that third-party applications can perform. Android™ 9 only allows for one Wifi scan every 30 seconds and iOS™ restricts the scan feature all together.

Provided is a method and a system of magnetic parameter based localization for mobile device navigation and positioning. The method, executed in a processor of a server computing device in one embodiment, comprises receiving, from a mobile device under traversal along an indoor path within an indoor area, a series of magnetic parameter measurements at each of a plurality of path segments; identifying, based on accessing reference magnetic data associated with the indoor path, an initial match for respective ones of a subset of path segments in accordance with the magnetic parameter measurements; initializing a set of alternative trajectories of the mobile device in accordance with the initial match; and determining, from the set of alternative trajectories, a current trajectory of the mobile device based at least in part on a best fit with a number of path segments associated with set of alternative trajectories.

Also provided is a server computing system for magnetic fingerprinting associated with mobile device indoor navigation and positioning. The server computing system comprises a processor and a memory. The memory includes instructions when executed in the processor causing operations comprising receiving, from a mobile device under traversal along an indoor path within an indoor area, a series of magnetic parameter measurements at each of a plurality of path segments; identifying, based on accessing reference magnetic data associated with the indoor path, an initial match for respective ones of a subset of path segments in accordance with the magnetic parameter measurements; initializing a set of alternative trajectories of the mobile device in accordance with the initial match; and determining, from the set of alternative trajectories, a current trajectory of the mobile device based at least in part on a best fit with a number of path segments associated with set of alternative trajectories.

The terms localize, or localization, as used herein refer to determining a unique coordinate position of the mobile device at a specific location along a route being traversed relative to the indoor area or building. In some embodiments, localization may also include determining a floor within the building, and thus involve determining not only horizontal planar (x, y) coordinates, but also include a vertical, or z, coordinate of the mobile device, the latter embodying a floor number within a multi-floor building or multi-level building, for example. In embodiments, the (x, y, z) coordinates may be expressed either in a local reference frame specific to the mobile device, or in accordance with a global coordinate reference frame.

The indoor area may be any one or a combination of a manufacturing facility, a shopping mall, a warehouse, an airport facility, a hospital facility, a university campus facility or any at least partially enclosed building.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of logic instructions that are executable by one or more processors. These instructions may be carried on a computer-readable medium. In particular, machines shown with embodiments herein include processor(s) and various forms of memory for storing data and instructions. Examples of computer-readable mediums and computer storage mediums include portable memory storage units, and flash memory (such as carried on smartphones). An embedded device as described herein utilizes processors, memory, and logic instructions stored on computer-readable medium. Embodiments described herein may be implemented in the form of computer processor-executable logic instructions or programs stored on computer memory mediums.

System Description

Figure 1:
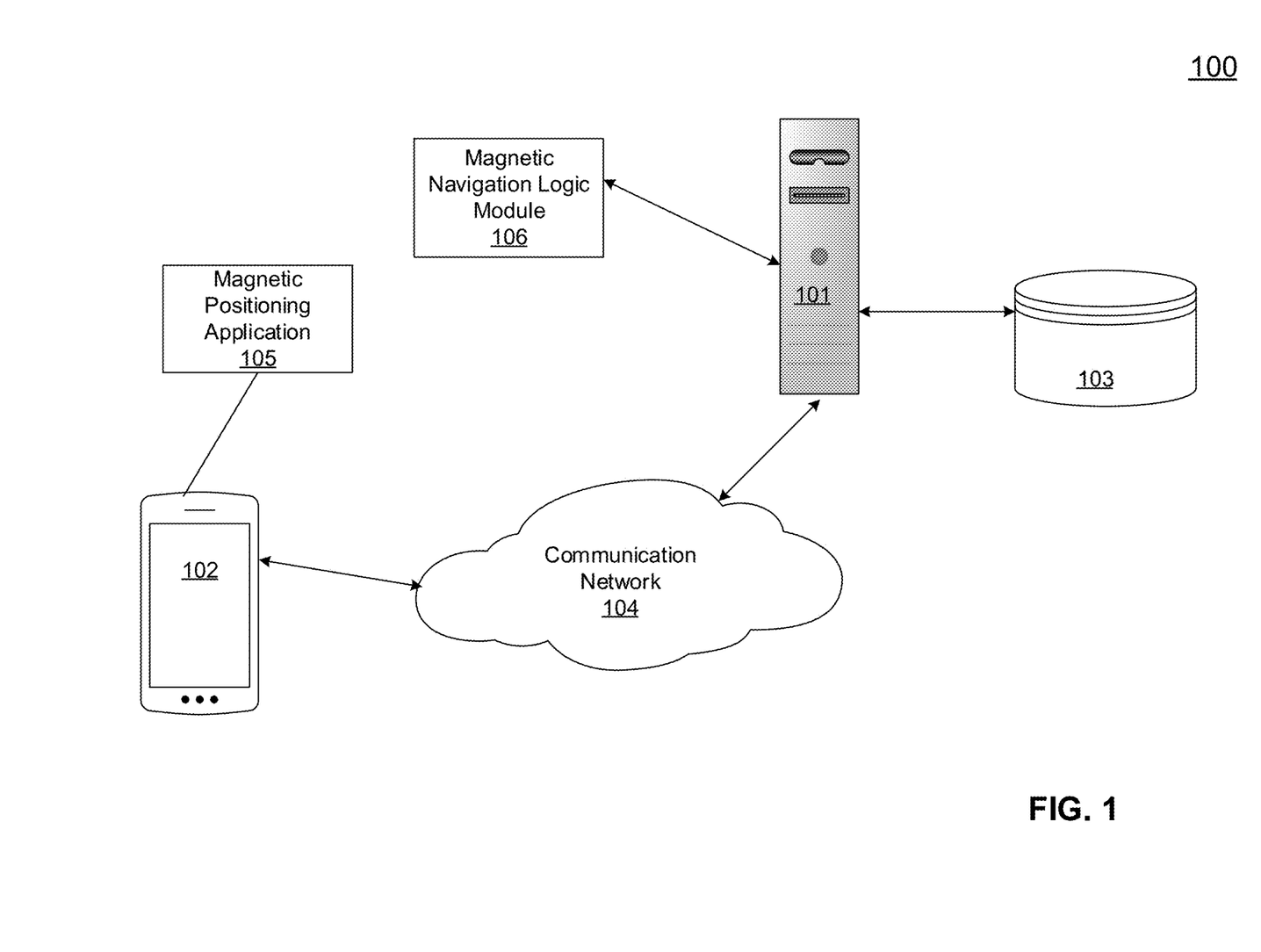
FIG. 1 illustrates, in an example embodiment, a magnetic parameter based system for mobile device indoor navigation and positioning.

FIG. 1 illustrates, in an example embodiment, a magnetic parameter based system 100 for mobile device indoor navigation and positioning. Mobile device 102 may include a processor, memory and associated circuitry to accomplish any one or more of telephony, data communication, and data computing. Mobile device 102 may be in communication with server computing device 101 via communication network 104. In other variations, mobile device 102 may be connected within a computer network communication system 104, including the internet or other wide area network, to remote server computing device 101 that stores, in a fingerprint database, magnetic fingerprint data of an indoor area. Magnetic fingerprint data acquired at mobile device 102 during real time traversal of paths or route within the indoor area can be uploaded to server 101.

Mobile device 102 may include magnetic characteristics sensor functionality by way of one or more magnetometer devices, in addition to inertial sensors such as an accelerometer and a gyroscope, barometric or other ambient pressure sensing functionality, humidity sensor, thermometer, and ambient lighting sensors such as to detect ambient lighting intensity and wireless signal strength sensors. Magnetic parameters sensed, whether directly or as calculated using one or more processors of mobile device 102 may include magnetic field strength, magnetic dip angle, and a magnetic field direction. The magnetic field in some embodiments may be detected, measured and rendered in accordance with separate x, y, and z-component vectors that constitute the magnetic field. Mobile device 102 may include location determination capability by way of a GPS module having a GPS receiver, and a communication interface for communicatively coupling to communication network 104, including by sending and receiving cellular data over data and voice channels.

Mobile device 102 includes magnetic positioning application 105. Magnetic positioning application 105 when executed in a processor of mobile device 102 captures magnetic parameter measurements associated with unique positions within the indoor area or infrastructure during traversal along a path or route. The magnetic parameter measurements captured at mobile device 102 can include magnetic field strength, magnetic dip angle and magnetic direction or orientation.

A fingerprint data repository, or a portion(s) thereof, may be stored in server computing device 101 (also referred to herein as server 101) and made communicatively accessible to mobile device 102 via communication network 104. Server 101 may include magnetic navigation logic module 106 comprised of instructions executable in a processor of server device 101, for use in conjunction with the fingerprint data repository that includes RSS fingerprint data. In some embodiments, it is contemplated that the fingerprint data repository, or any portions of data and processor-executable instructions constituting the fingerprint data repository, may be downloaded for storage, at least temporarily, within a memory of mobile device 102. In embodiments, the fingerprint map data stored in the fingerprint data repository further associates particular positions along pedestrian route of the manufacturing facility or indoor area with a particular combination of time-stamped fingerprint data, including gyroscope data, accelerometer data, wireless signal strength data, wireless connectivity data, magnetic data, barometric data, acoustic data, line-of sight data, and ambient lighting data stored thereon.

The terms fingerprint and fingerprint data as used herein refer to time-correlated, time-stamped individual measurements of any of, or any combination of, received wireless communication signal strength and signal connectivity parameters, magnetic field parameters (strength, direction) or barometric pressure parameters, and mobile device inertial sensor data at known, particular locations along a route being traversed, and also anticipated for traversal, by the mobile device. In other words, a fingerprint as referred to herein may include a correlation of sensor and signal information (including, but not necessarily limited to wireless signal strength, wireless connectivity information, magnetic or barometric information, inertial sensor information and GPS location information) associated for a unique location relative to the facility in accordance with a particular time stamp of gathering the set of mobile sensor data by time correlating the mobile device gyroscope data, the mobile device accelerometer data, mobile device magnetometer data and any other applicable mobile device sensor data, for example.

Thus, magnetic fingerprint data associated with magnetic parameters at a particular location or position provides a magnetic fingerprint signature that uniquely correlates to that particular location or position. A sequence of positions or locations that constitute a navigation path traversed by the mobile device relative to a given indoor facility may be fingerprint-mapped during a calibration process, and the resulting fingerprint map stored in a fingerprint data repository of server 101, such as database 103 that is communicatively accessible to server 101. Server 101 can also store, or communicatively access, respective fingerprint maps of various buildings and indoor areas. The respective building or indoor facility fingerprint maps, or any portions thereof, may be downloaded into a memory of mobile device 102 for use in conjunction with the pedestrian navigation software application executing thereon.

The magnetic characteristics of the earth's magnetic field may vary in different zones of a given building given the presence of steel structural elements, ferromagnetic objects and the electronic equipment typically contained there. Such elements perturb the earth's magnetic field which may provide the potential for distinguishing unique locations or positions inside the buildings. In general, a non-uniform indoor ambient magnetic field produces different magnetic observations depending on the path taken through it. Static objects or infrastructures inside buildings, such as steel structures, electric power systems and electronic and mechanical appliances, perturb the earth's magnetic field in a manner that establishes a profile of magnetic field values that constitute a map composed of magnetic field fingerprints. Certain elements inside buildings can distort or attenuate the relatively weak direction of the earth's magnetic field. Magnetic field perturbation as sensed or measured at a given location within the building may decrease rapidly as the distance from an interfering source increases. The size of the object responsible for the interference has a direct impact on the perturbation generated. More specifically, the larger the object, the greater the distance needed for the perturbation to decrease.

Figure 2:
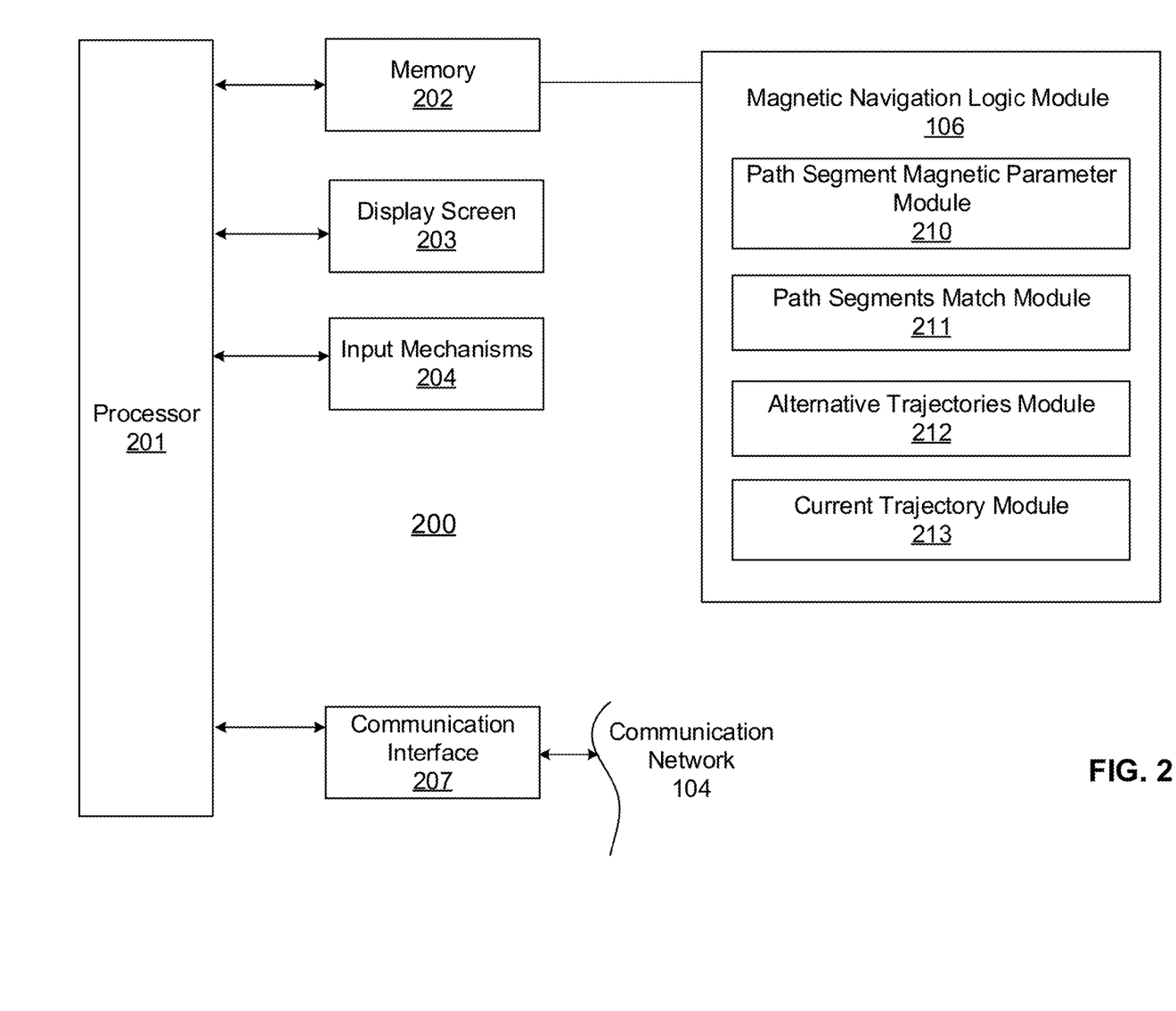
FIG. 2 illustrates, in one example embodiment, an architecture of a server computer implementing a magnetic parameter based system for mobile device indoor navigation and positioning.

FIG. 2 illustrates, in one example embodiment, an architecture 200 of a server computer implementing a magnetic parameter based system for mobile device indoor navigation and positioning. Server 101, in embodiment architecture 200, may be implemented on one or more server devices, and includes processor 201, memory 202 which may include a read-only memory (ROM) as well as a random access memory (RAM) or other dynamic storage device, display device 203, input mechanisms 204 and communication interface 207 communicatively coupled to communication network 104. Processor 201 is configured with software and/or other logic to perform one or more processes, steps and other functions described with implementations, such as described by FIGS. 1-3 herein. Processor 201 may process information and instructions stored in memory 202, such as provided by a random access memory (RAM) or other dynamic storage device, for storing information and instructions which are executable in processor 201. Memory 202 also may be used for storing temporary variables or other intermediate information during execution of instructions to be executed by processor 201. Memory 202 may also include the ROM or other static storage device for storing static information and instructions for processor 201; a storage device, such as a magnetic disk or optical disk, may be provided for storing information and instructions. Communication interface 207 enables server 101 to communicate with one or more communication networks 104 (e.g., a cellular network) through use of the both wired and wireless network links. Using the network link, server 101 can communicate with Mobile device 102.

Magnetic navigation logic module 106 of server 101 may include executable instructions comprising sub-modules path segment magnetic parameter module 210, path segments match module 211, alternative trajectories module 212 and current trajectory module 213.

Processor 201 uses executable instructions of path segment magnetic parameter module 210 to receive, from a mobile device under traversal along an indoor path within an indoor area, a series of magnetic parameter measurements at each of a plurality of path segments.

Processor 201 uses executable instructions stored in path segments match module 211 to identify, based on accessing reference magnetic data associated with the indoor path, an initial match for respective ones of a subset of path segments from the plurality of path segments in accordance with the magnetic parameter measurements.

Processor 201 uses executable instructions stored in alternative trajectories module 212 to initialize a set of alternative trajectories of the mobile device 102 in accordance with the initial match for the respective ones of the subset of path segments.

Processor 201 uses executable instructions stored in current trajectory module 213 to determine, from the set of alternative trajectories, a current trajectory of the mobile device based at least in part on a best fit with a number of path segments associated with set of alternative trajectories.

Methodology

Figure 3:
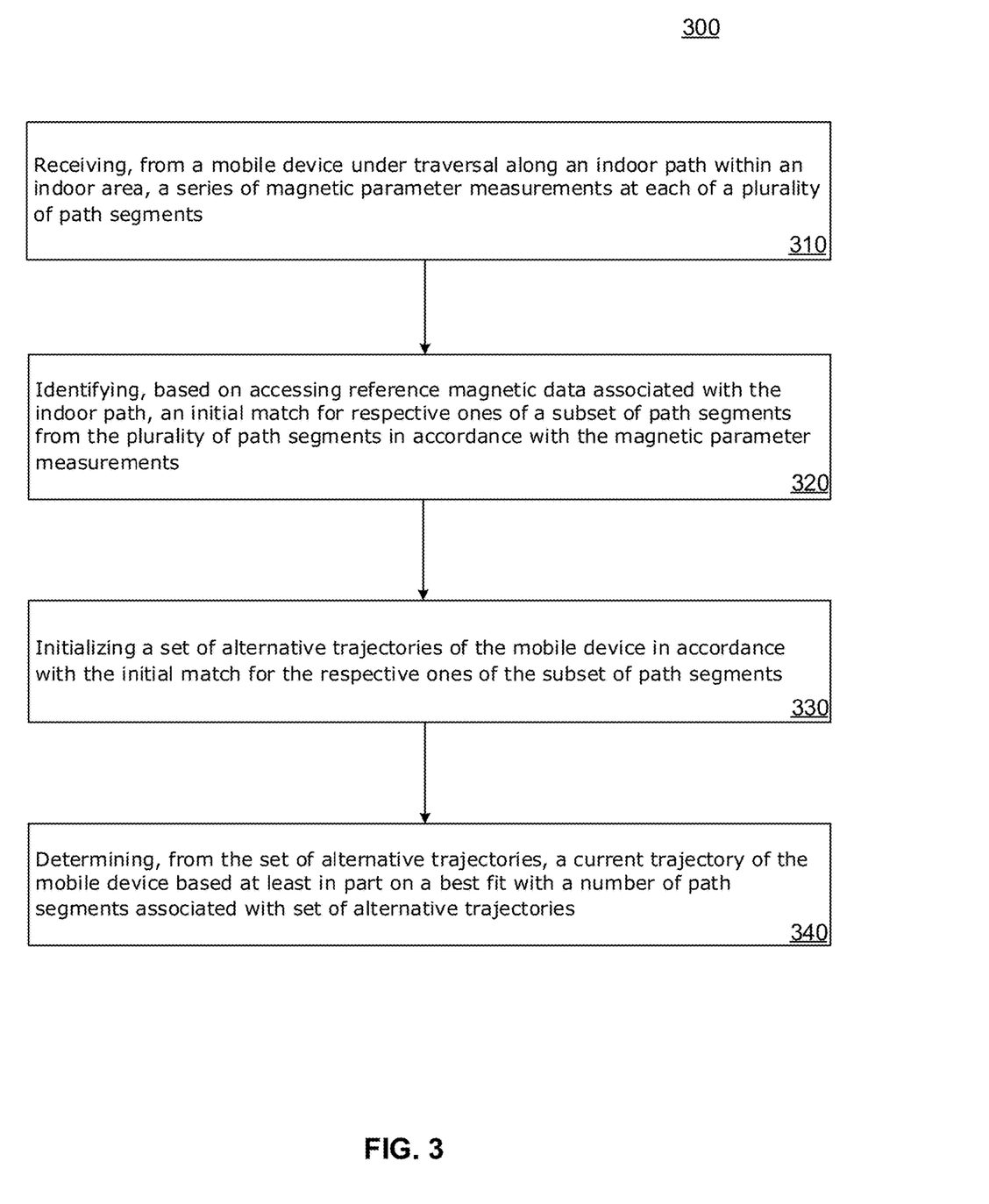
FIG. 3 illustrates, in an example embodiment, a method of magnetic parameter based localization for mobile device indoor navigation and positioning.

FIG. 3 illustrates, in an example embodiment, a method 300 of magnetic parameter based localization for mobile device indoor navigation and positioning. In describing examples of FIG. 3, reference is made to the examples of FIGS. 1-2 and 4 for purposes of illustrating suitable components or elements for performing a step or sub-step being described.

Examples of method steps described herein relate to the use of server device 101 for implementing the techniques described.

At step 310, processor 201 executes instructions included in path segment magnetic parameter module 210 to receive, from a mobile device under traversal along an indoor path within an indoor area, a series of magnetic parameter measurements at each of a plurality of path segments.

In an embodiment, the magnetic field parameter is a magnetic field strength.

In other variations, the magnetic field parameter measurement is a magnetic dip angle.

In some embodiments, the magnetic field parameter measurement is at least one of an x, y, z magnetic field vector component. In other variations, the magnetic field parameter is a magnetic compass direction or orientation.

In embodiments, the high complexity problem of matching magnetic measurements can be solved efficiently by using a "best first" searching approach. Instead of comparing the full set of n real time measurements with all possible chains of n reference segments, the first real-time measurement is compared to a set of possible segments, the best matching segment then is extended to its neighbors and added as an alternative, in this case the first two real-time measurements are compared to the alternatives that are two segments long. By iteratively extending only the best alternatives the number of required comparisons is greatly reduced and the matching problem can be solved efficiently on a mobile device.

Illustrative embodiments herein generate a set of segments that represent the walking paths on a floorplan. In an example, the segments should be of predefined length, for example, roughly 1nn in length. In some embodiments this can be a manual or an automated procedure.

Embodiments further calibrate the segments by walking along each segment while a mobile device takes magnetic measurements. Each segment should be done multiple times and the reference segment will be an aggregate of all the instances. Each reference segment is then stored in an efficient data structure that will allow the segments to be queried according to their magnetic properties in O(log n) time. In some embodiments this can be an AVL tree, Heap or other data structure.

Next, n consecutive magnetic measurements are taken in real time.

$$m = \begin{bmatrix} m_0 \\ \vdots \\ m_n \end{bmatrix}$$

A set of alternative matches are initialized where each alternative starts as 1 segment long. This initial set is queried from the reference data structure having reference segments described above. From the data structure all reference segments are obtained that are in the range $[m_0-e, m_0+e]$ where e is a threshold value.

Each new alternative is evaluated according to the difference between the real-time measurements and the reference measurements. In one embodiment a difference score could be evaluated by the equation:

$$d_a = \sum_{i=0}^{len(a)} \text{ABS}(m_i - r_i)$$

Where a is the alternative match, len($\alpha$) is the length of the match, $m_i$ is real-time measurement i and $r_i$ is the reference measurement of segment i of the alternative. Once evaluated each alternative is stored in another data structure, called a priority queue, which is similar to the data structure described above, except alternatives are stored according to their difference score.

Next the alternative with the minimum difference score is extended. Meaning it is removed from the priority queue and new alternatives which are one segment longer are created. The preceding steps are then repeated until the alternative with the minimum difference score grows to a predetermined number of segments long, say, n segments long. In other embodiments the stopping condition can be extended to retrieve the top k matches, this would add an additional layer of robustness to the system.

At step 320, processor 201 executes instructions included in path segments match module 211 to identify, based on accessing reference magnetic data associated with the indoor path, an initial match for respective ones of a subset of path segments from the plurality of path segments in accordance with the magnetic parameter measurements.

At step 330, processor 201 of server 101 executes instructions included in alternative trajectories module 212 to initialize a set of alternative trajectories of the mobile device in accordance with the initial match for the respective ones of the subset of path segments.

At step 340, processor 201 of server 101 executes instructions included in current trajectory module 213 to determining, from the set of alternative trajectories, a current trajectory of the mobile device based at least in part on a best fit with a number of path segments associated with set of alternative trajectories.

Figure 4:
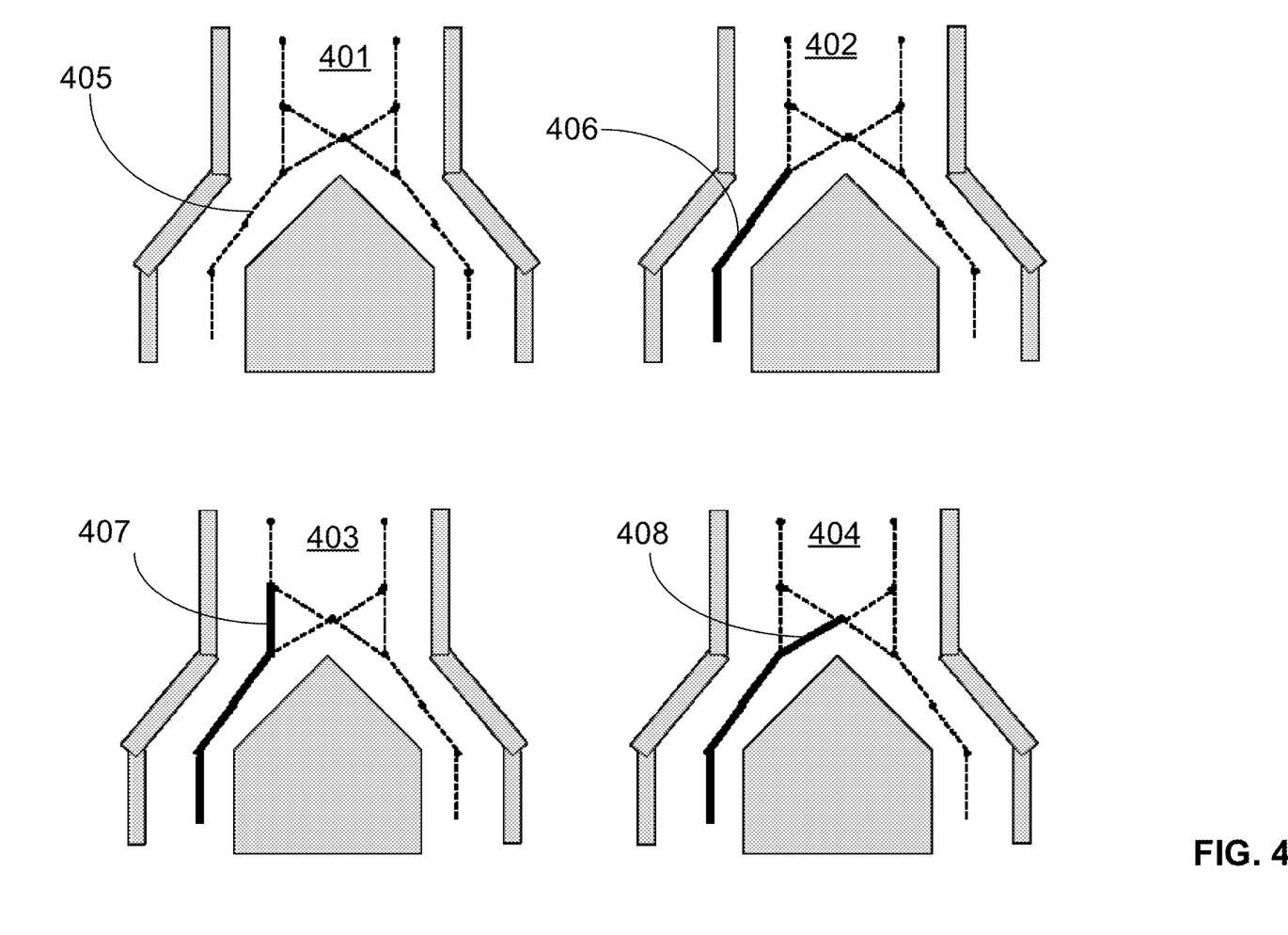
FIG. 4 illustrates, in an example embodiment, identifying alternative trajectory path segments during mobile device indoor navigation.

FIG. 4 illustrates, in an example embodiments 401-404, identifying alternative trajectory path segments during mobile device indoor navigation. In describing examples of FIG. 4, reference is made to the examples of FIGS. 1-3 for purposes of illustration being described. Path segment 405 is an illustrative current path segment, constituted of a path length ranging from 0.8 m to 1.2 m in some embodiments, being traversed within the indoor area. Embodiment 402 shows the current path 406. Embodiments 403, 404 show extension alternatives trajectories 407, 408 respectively which are one segment longer as created.

Figure 5:
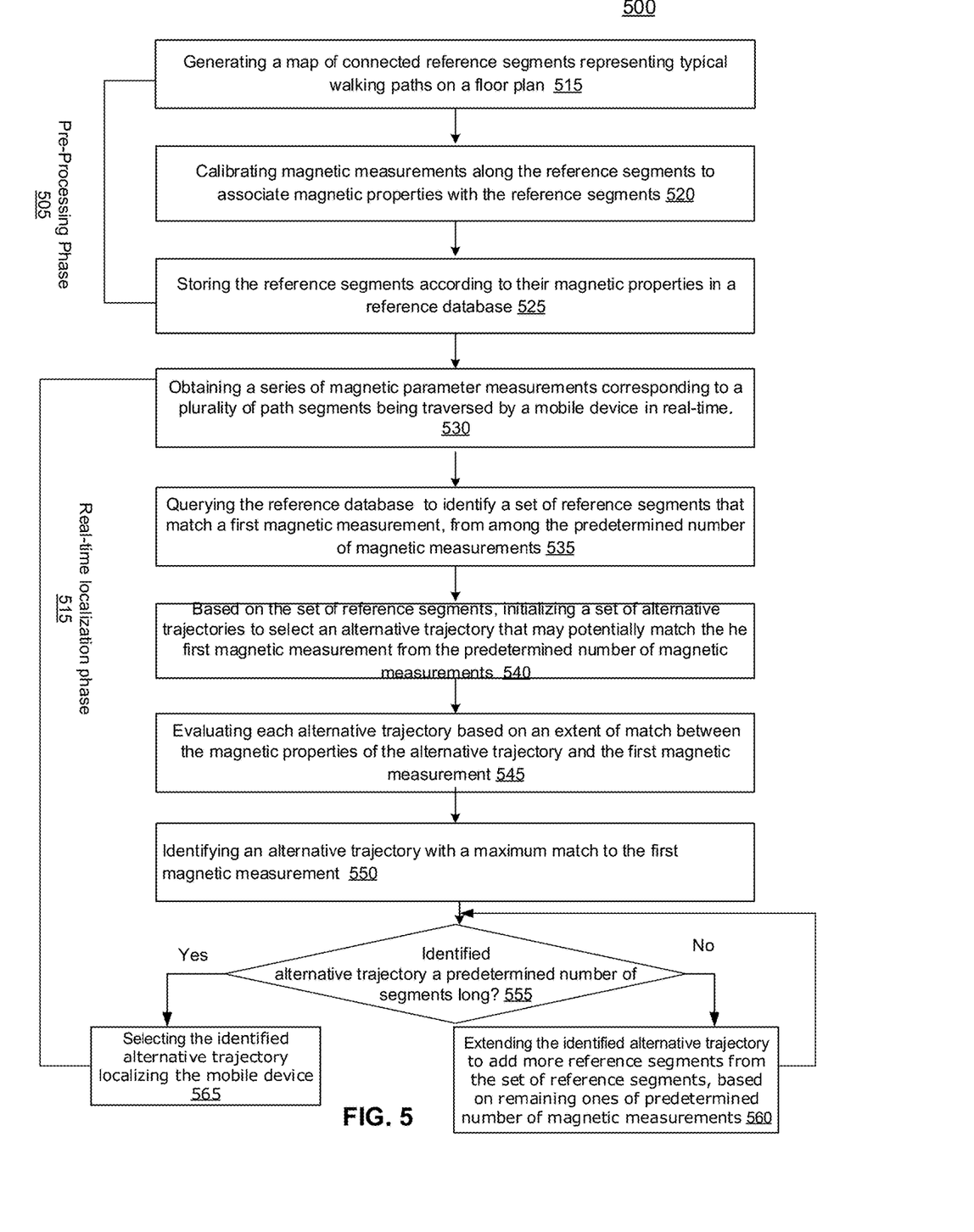
FIG. 5 illustrates, in an example embodiment, a method of localizing a mobile device in an indoor area.

FIG. 5 illustrates, in an example embodiment, a method 500 of magnetic parameter based localization for mobile device indoor navigation and positioning. In describing examples of FIG. 5, reference is made to the examples of FIGS. 1-3 for purposes of illustrating suitable components or elements for performing a step or sub-step being described.

In an example, the method 500 may be divided in two phases, a preprocessing phase 505 and a real-time localization phase 510. The preprocessing phase 505 relates to preprocessing done to have system ready for real-time localization to be done in next phase 510. The preprocessing may be performed, for instance, at a server computing device. In the preprocessing phase 505, for instance, at step 515 a map of connected segments representing typical walking paths on a floor plan is generated. The segments may be referred to as reference segments.

At step 520, magnetic measurements along the reference segments are calibrated to associate magnetic properties/the magnetic field parameter measurement with the reference segments. Examples of the properties include, but are not limited to, magnetic field strength, a magnetic dip angle, at least one of an x, y, z magnetic field vector component, magnetic compass direction or orientation, and a spatial gradient of a magnetic property, such as a magnetic field strength, at least one of an x, y, z magnetic field vector component, etc.

At step 525, the reference segments are stored in a reference database or a reference data structure as described with reference to FIGS. 1-3. In example, the reference segments are stored according to their magnetic properties to allow the reference segments to be queried according to their magnetic properties.

At step 530, the real-time localization phase 510 starts. In an example, the real-time localization phase 515 may be implemented at a computing device, such as a mobile device to be localized. It will be appreciated that in other embodiments the real-time localization may be performed at other computing devices, such as the server computing device providing localization services to other devices, such as mobile devices in an indoor area. At step 530, a series of magnetic parameter measurements corresponding to a plurality of path segments being traversed by a mobile device to be localized are obtained in real-time to localize the mobile device. The series of magnetic measurements include a predetermined number of magnetic parameter measurements.

In an example, each individual magnetic measurement may not be unique enough to identify the user's location; therefore, a collection of measurements, i.e., a series of measurements, are considered and associated with a corresponding sequence of locations (i.e., a path segment). The path segment may be understood as a collection of locations, for instance, from some x,y to another x,y. However, it will be appreciated that a path segment doesn't necessarily need to be a straight line and may be a bend around a hallway or something that is parallel to the walls, etc. For instance, for each step the user takes a magnetic property may be measured at the beginning of the step and at the end of the step, the change in the magnetic property that was measured, i.e., a spatial gradient should match magnetic measurement(s) corresponding to a segment in the reference data. However, matching one measurement to the reference data may return many possible matching reference segments, and therefore just using one measurement may not be computationally efficient or accurate. Therefore, enough of these measurements are taken consecutively so that they can be uniquely matched to the reference segments in the reference data. The number of measurements in a series or a collection may be predetermined and configurable.

At step 535, the reference database is queried to identify a set of reference segments that match a first magnetic measurement, from among the predetermined number of magnetic measurements. A reference segment is identified as matching to a magnetic parameter measurement when the corresponding magnetic measurement of the reference segment is within a threshold of the magnetic parameter measurement. In an example, all reference segments that are in the range $[m_0-e, m_0+e]$ where m represents magnetic parameter measurement of $0^{th}$ reference segment, and e is a threshold value, are identified to be matching.

At step 540, based on the set of reference segments identified at set 535, a set of alternative trajectories is initialized to select an alternative trajectory that may potentially match the predetermined number of magnetic measurements. In an example, while initializing, an alternative trajectory includes a single reference segment, i.e., the alternative trajectory is one segment long, when initialized, and the alternative trajectory may be iteratively extended as explained below. Further, the reference segment belongs to the set of reference segments.

At step 545, each alternative trajectory is evaluated based on an extent of match between the magnetic properties of the alternative trajectory and the first magnetic measurement from among the predetermined number of magnetic measurements received in real-time. For instance, a difference score, as described above, may be computed for each of the new alternative trajectory.

At step 550, an alternative trajectory with a maximum match to the first measurement from the predetermined number of magnetic measurements, i.e., an alternative trajectory with a minimum difference score is identified.

At step 555, it is ascertained whether the identified alternative trajectory is a predetermined number of segments long. The predetermined number of segments may be predefined in the system and may be configurable.

If at step 555, it is ascertained that the identified alternative trajectory is not predetermined number of segments long, the method 500 branches to step 560, where the identified alternative trajectory is extended to add more reference segments from the set of reference segments identified at step 535, based on corresponding magnetic properties. For instance, the method loops back to step 550, where next set of reference segments are matching to a second magnetic measurement in the series of measurements obtained at step 530 are identified and appended to the previously identified alternative trajectory to provide a collection of alternative trajectories that are two segments long. This way, the previously identified best alternative trajectory is expanded to include another reference segment, which is added as an alternative. For instance, in first iteration, the first two real-time measurements are compared to the alternatives that are two segments long. By iteratively extending only the best alternatives the number of required comparisons is greatly reduced and the matching problem can be solved efficiently on a mobile device.

If at step 560, it is ascertained that the identified alternative trajectory is predetermined number of segments long, the method 500 proceeds to step 565, where the identified alternative trajectory is selected as a final alternative trajectory for localizing the mobile device.

In an example, a method of localizing the mobile device may be implemented on a computing device, such as the mobile device itself. The method includes obtaining a predetermined number of magnetic parameter measurements corresponding to a plurality of path segments in an indoor path traversed by a mobile device; identifying, based on accessing a reference database associated with the indoor path, a set of reference segments having a magnetic parameter measurement matching a first magnetic parameter measurement, the reference database including a plurality of reference segments and corresponding magnetic parameter measurements for an indoor area comprising the indoor path; initializing a set of alternative trajectories of the mobile device in accordance with the identified set of reference segments; and determining, from the set of alternative trajectories, a current alternative trajectory of the mobile device with a maximum match to the first magnetic parameter measurement; iteratively extending the current alternative trajectory to determine a final alternative trajectory matching the predetermined number of magnetic parameter measurements, based on remaining ones of the predetermined magnetic parameter measurements; and localizing the mobile device in accordance with the final alternative trajectory.

In an example, the iterative extending of the current alternative trajectory is based on a length of the current alternative trajectory, and the final alternative trajectory is a predetermined number of segments long. Further, a reference segment is identified as matching to a magnetic parameter measurement from the predetermined number of magnetic parameter measurements when the corresponding magnetic parameter measurement of the reference segment is within a threshold of the magnetic parameter measurement.

In an example, the magnetic parameter measurement comprises one of a magnetic field strength, at least one of an x, y, z magnetic field vector component, a magnetic dip angle, a magnetic field direction. The magnetic parameter measurement may also comprise a spatial gradient of a magnetic property.

In an example, iteratively extending the current alternative trajectory comprises: ascertaining whether the current alternative trajectory is predetermined number of segments long; when the current alternative trajectory is predetermined number of segments long, selecting the current alternative trajectory as the final alternative trajectory; when the current alternative trajectory is not predetermined number of segments long, identifying another of set reference segments from the reference database matching a subsequent magnetic parameter measurement in the predetermined number of magnetic parameter measurements; generating a subsequent set of alternative trajectories by appending each reference segment of the another of set reference segments to the current alternative trajectory; determining a subsequent current trajectory having a maximum match with the first magnetic parameter measurement and the subsequent magnetic parameter measurement; and iteratively extending the subsequent current trajectory until the final alternative trajectory is the predetermined number of segments long. For example, a minimum length for an alternative trajectory to be selected for localization may be predefined, for instance, It may be redefined that the final alternative trajectory should be a predetermined number of segments, say, n segments long. When a trajectory does not include n segments, i.e., it is not of the minimum length, it is iteratively extended to include more reference segments. So, if initially best trajectory was selected based on first measurement (obtained real-time), to extend this best trajectory, another set of reference segments that match the second measurement (i.e., subsequent measurement) are identified. Further, a new set of alternative trajectories is generated by adding each of these new reference segments to the previously identified best trajectory. The process is repeated till the final alternative trajectory is of the minimum length.

In an example, determining, from the set of alternative trajectories, the current alternative trajectory comprises determining a difference score for each alternative trajectory, the difference score being indicative of an extent of mismatch between magnetic parameter measurements of a corresponding alternative trajectory and the predetermined number of magnetic parameter measurements. The difference score of an alternative trajectory may be based on a length of the alternative trajectory, the predetermined number of magnetic parameter measurements and magnetic parameter measurements corresponding to reference segments of the alternative trajectory.

In an example, a path segment includes a sequence of locations in the indoor path. Further, the plurality of reference segments may be generated based on a map of connected segments representing typical walking paths on a floor plan of the indoor area.

Thus, in example embodiments of the present disclosure, instead of trying all possibly combinations, segment matching is done iteratively, which allows for it to be done at a much lower complexity. Consequently, the present disclosure provides for making a traditionally complicated path segment matching problem into a much more manageable one.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no specific mention of the particular combination of features. Thus, the absence of describing combinations should not preclude the inventors from claiming rights to such combinations.

What is claimed is:

1. A method comprising:
obtaining a predetermined number of magnetic parameter measurements corresponding to a plurality of path segments in an indoor path being traversed by a mobile device;
identifying, based on accessing a reference database associated with the indoor path, a set of reference path segments having a magnetic parameter measurement matching a first magnetic parameter measurement, the reference database including a plurality of reference path segments and corresponding magnetic parameter measurements for an indoor area comprising the indoor path;
initializing a set of alternative trajectories of the mobile device in accordance with the identified set of reference path segments;
determining, from the set of alternative trajectories, a current alternative trajectory of the mobile device with a maximum match to the first magnetic parameter measurement, the maximum match being based on a difference score evaluated for each of the set of alternative trajectories;
iteratively extending the current alternative trajectory to determine a final alternative trajectory matching the predetermined number of magnetic parameter measurements, based on remaining ones of the predetermined magnetic parameter measurements; and
localizing the mobile device in accordance with the final alternative trajectory.

2. The method of claim 1, wherein the iterative extending of the current alternative trajectory is based on a length of the current alternative trajectory, and wherein the final alternative trajectory is a predetermined number of segments long.

3. The method of claim 1, wherein a reference path segment is identified as matching to a magnetic parameter measurement from the predetermined number of magnetic parameter measurements when the corresponding magnetic parameter measurement of the reference path segment is within a threshold of the magnetic parameter measurement.

4. The method of claim 1 wherein the magnetic parameter measurement comprises one of a magnetic field strength, at least one of an x, y, z magnetic field vector component, a magnetic dip angle, a magnetic field direction.

5. The method of claim 1 wherein the magnetic parameter measurement comprises a spatial gradient of a magnetic property.

6. The method of claim 1, iteratively extending the current alternative trajectory comprises:
   ascertaining whether the current alternative trajectory is predetermined number of segments long;
   when the current alternative trajectory is predetermined number of segments long, selecting the current alternative trajectory as the final alternative trajectory; and
   when the current alternative trajectory is not predetermined number of segments long:
      identifying another of set reference path segments from the reference database matching a subsequent magnetic parameter measurement in the predetermined number of magnetic parameter measurements;
      generating a subsequent set of alternative trajectories by appending each reference path segment of the another of set reference path segments to the current alternative trajectory;
      determining a subsequent current trajectory having a maximum match with the first magnetic parameter measurement and the subsequent magnetic parameter measurement; and
      iteratively extending the subsequent current trajectory until the final alternative trajectory is the predetermined number of segments long.

7. The method of claim 1, wherein determining, from the set of alternative trajectories, the current alternative trajectory comprises determining the difference score for each alternative trajectory, the difference score being indicative of an extent of mismatch between magnetic parameter measurements of a corresponding alternative trajectory and the predetermined number of magnetic parameter measurements.

8. The method of claim 7, wherein the difference score of an alternative trajectory is based on a length of the alternative trajectory, the predetermined number of magnetic parameter measurements and magnetic parameter measurements corresponding to reference path segments of the alternative trajectory.

9. The method of claim 1 wherein a path segment includes a sequence of locations in the indoor path.

10. The method of claim 1 wherein the plurality of reference path segments are generated based on a map of connected segments representing typical walking paths on a floor plan of the indoor area.

11. A computing device comprising:
   a processor; and
   a memory including instructions when executed in the processor causing operations comprising:
   obtaining a predetermined number of magnetic parameter measurements corresponding to a plurality of path segments in an indoor path being traversed by a mobile device;
   identifying, based on accessing a reference database associated with the indoor path, a set of reference path segments having a magnetic parameter measurement matching a first magnetic parameter measurement, the reference database including a plurality of reference path segments and corresponding magnetic parameter measurements for an indoor area comprising the indoor path;
   initializing a set of alternative trajectories of the mobile device in accordance with the identified set of reference segments;
   determining, from the set of alternative trajectories, a current alternative trajectory of the mobile device with a maximum match to the first magnetic parameter measurement, the maximum match being based on a difference score evaluated for each of the set of alternative trajectories;
   iteratively extending the current alternative trajectory to determine a final alternative trajectory matching the predetermined number of magnetic parameter measurements, based on remaining ones of the predetermined magnetic parameter measurements; and
   localizing the mobile device in accordance with the final alternative trajectory.

12. The computing device of claim 11, wherein the computing device is the mobile device to be localized.

13. The computing device of claim 11, wherein a reference path segment is identified as matching to a magnetic parameter measurement from the predetermined number of magnetic parameter measurements when the corresponding magnetic parameter measurement of the reference path segment is within a threshold of the magnetic parameter measurement.

14. The computing device of claim 11, wherein the magnetic parameter measurement comprises one of a magnetic field strength, at least one of an x, y, z magnetic field vector component, a magnetic dip angle, a magnetic field direction.

15. The computing device of claim 11, wherein a path segment includes a sequence of locations in the indoor path.

16. The computing device of claim 15, wherein the magnetic parameter measurement comprises a spatial gradient of a magnetic property.

17. The computing device of claim 11, wherein iteratively extending the current alternative trajectory comprises:
   ascertaining whether the current alternative trajectory is predetermined number of segments long;
   when the current alternative trajectory is predetermined number of segments long, selecting the current alternative trajectory as the final alternative trajectory; and
   when the current alternative trajectory is not predetermined number of segments long:
      identifying another of set reference path segments from the reference database matching a subsequent magnetic parameter measurement in the predetermined number of magnetic parameter measurements;
      generating a subsequent set of alternative trajectories by appending each reference path segment of the another of set reference path segments to the current alternative trajectory;
      determining a subsequent current trajectory having a maximum match with the first magnetic parameter measurement and the subsequent magnetic parameter measurement; and
      iteratively extending the subsequent current trajectory until the final alternative trajectory is the predetermined number of segments long.

18. The computing device of claim 11, wherein determining, from the set of alternative trajectories, the current alternative trajectory comprises determining the difference score for each alternative trajectory, the difference score being indicative of an extent of mismatch between magnetic parameter measurements of a corresponding alternative trajectory and the predetermined number of magnetic parameter measurements.

19. The computing device of claim 18, wherein the difference score of an alternative trajectory is based on a length of the alternative trajectory, the predetermined number of magnetic parameter measurements and magnetic parameter measurements corresponding to reference path segments of the alternative trajectory.

20. The computing device of claim 11, wherein the plurality of reference path segments are generated based on a map of connected segments representing typical walking paths on a floor plan of the indoor area.

\* \* \* \* \*